Figure 1:
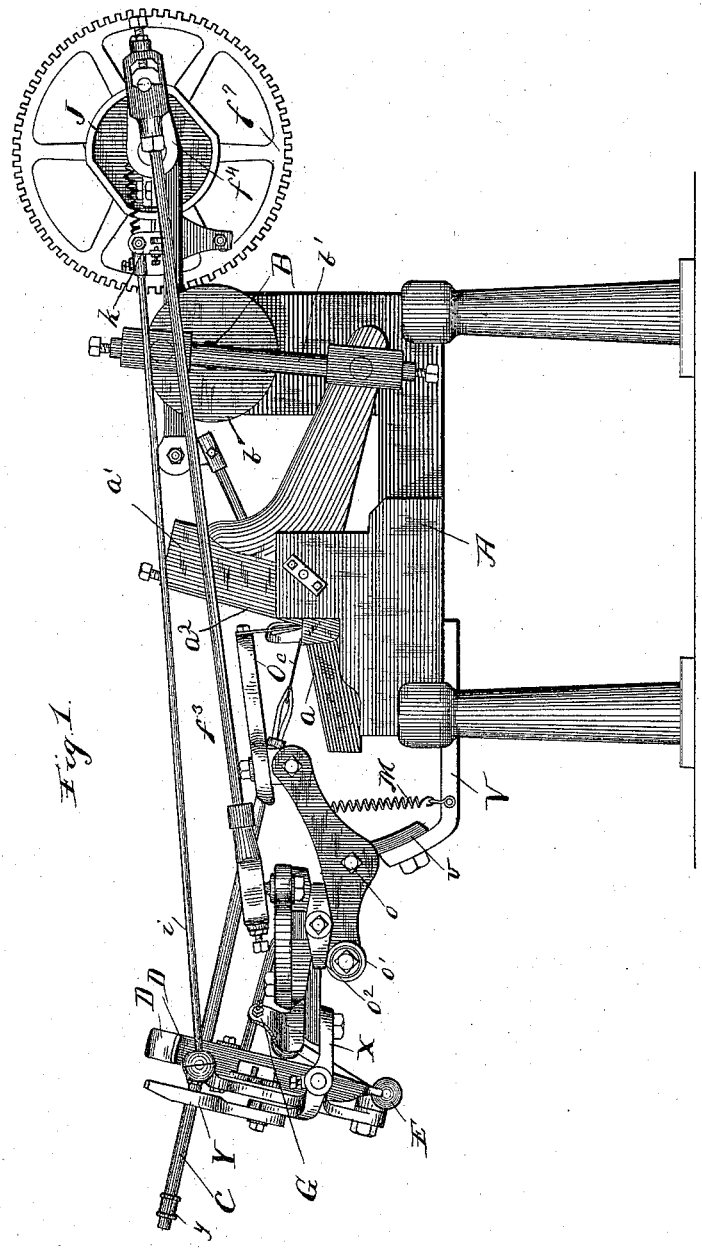

(No Model.) 6 Sheets—Sheet 1.

J. C. GOULD.
NAIL PLATE FEEDER.

No. 385,112. Patented June 26, 1888.

Witnesses:

Inventor:
John C. Gould.
By Munday Evarts & Adcock.
His Attorneys.

(No Model.) 6 Sheets—Sheet 2.
J. C. GOULD.
NAIL PLATE FEEDER.

No. 385,112. Patented June 26, 1888.

Witnesses:
Lew. E. Curtis.
H. W. Munday.

Inventor:
John C. Gould.
By Munday, Evarts & Adcock,
His Attorneys.

(No Model.) 6 Sheets—Sheet 3.
J. C. GOULD.
NAIL PLATE FEEDER.

No. 385,112. Patented June 26, 1888.

Witnesses:
Geo. C. Curtis.
H. W. Munday.

Inventor:
John C. Gould.
By Munday, Evarts & Adcock
his Attorneys.

(No Model.) 6 Sheets—Sheet 4.
J. C. GOULD.
NAIL PLATE FEEDER.
No. 385,112. Patented June 26, 1888.
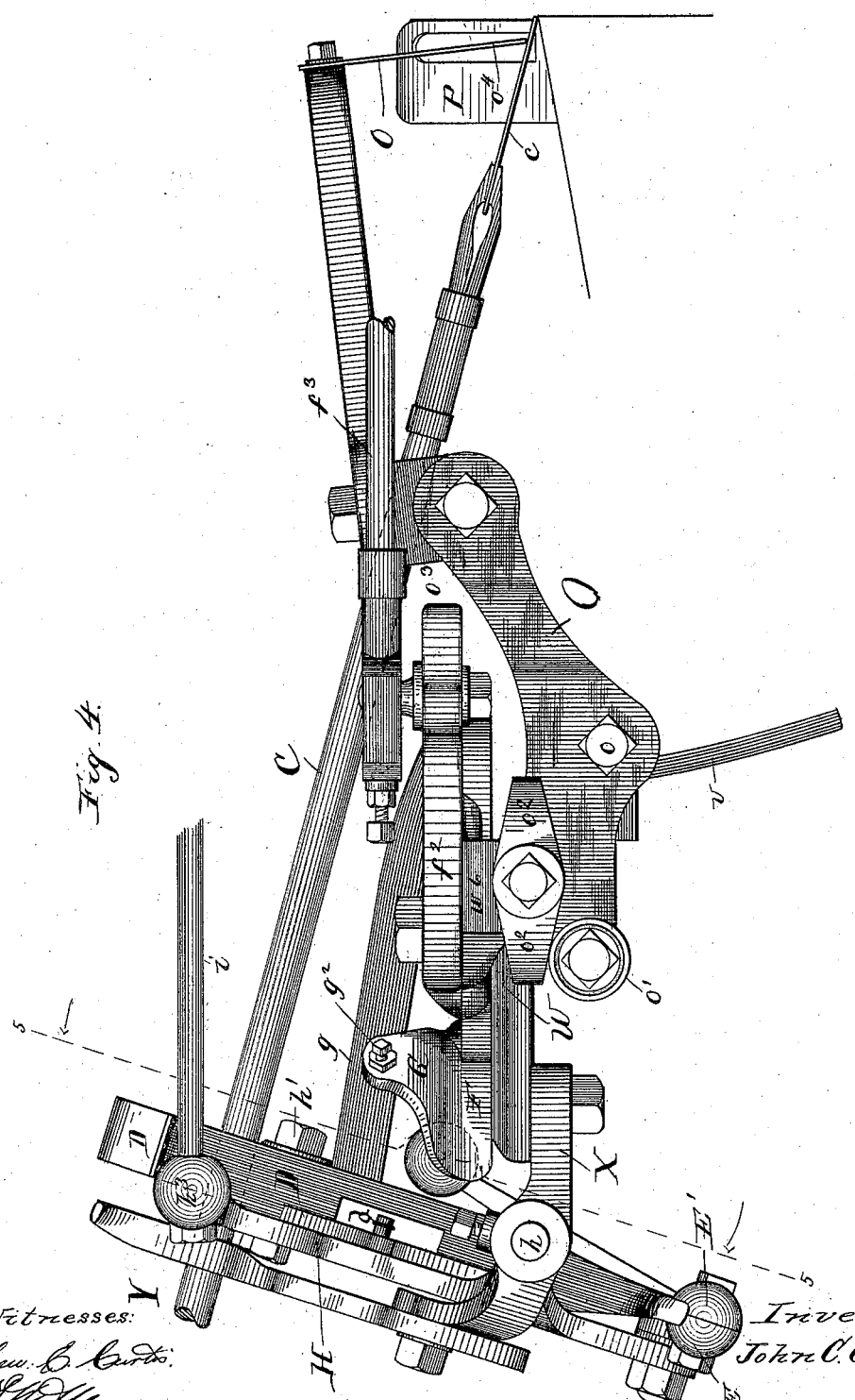

(No Model.) 6 Sheets—Sheet 5.
J. C. GOULD.
NAIL PLATE FEEDER.
No. 385,112. Patented June 26, 1888.
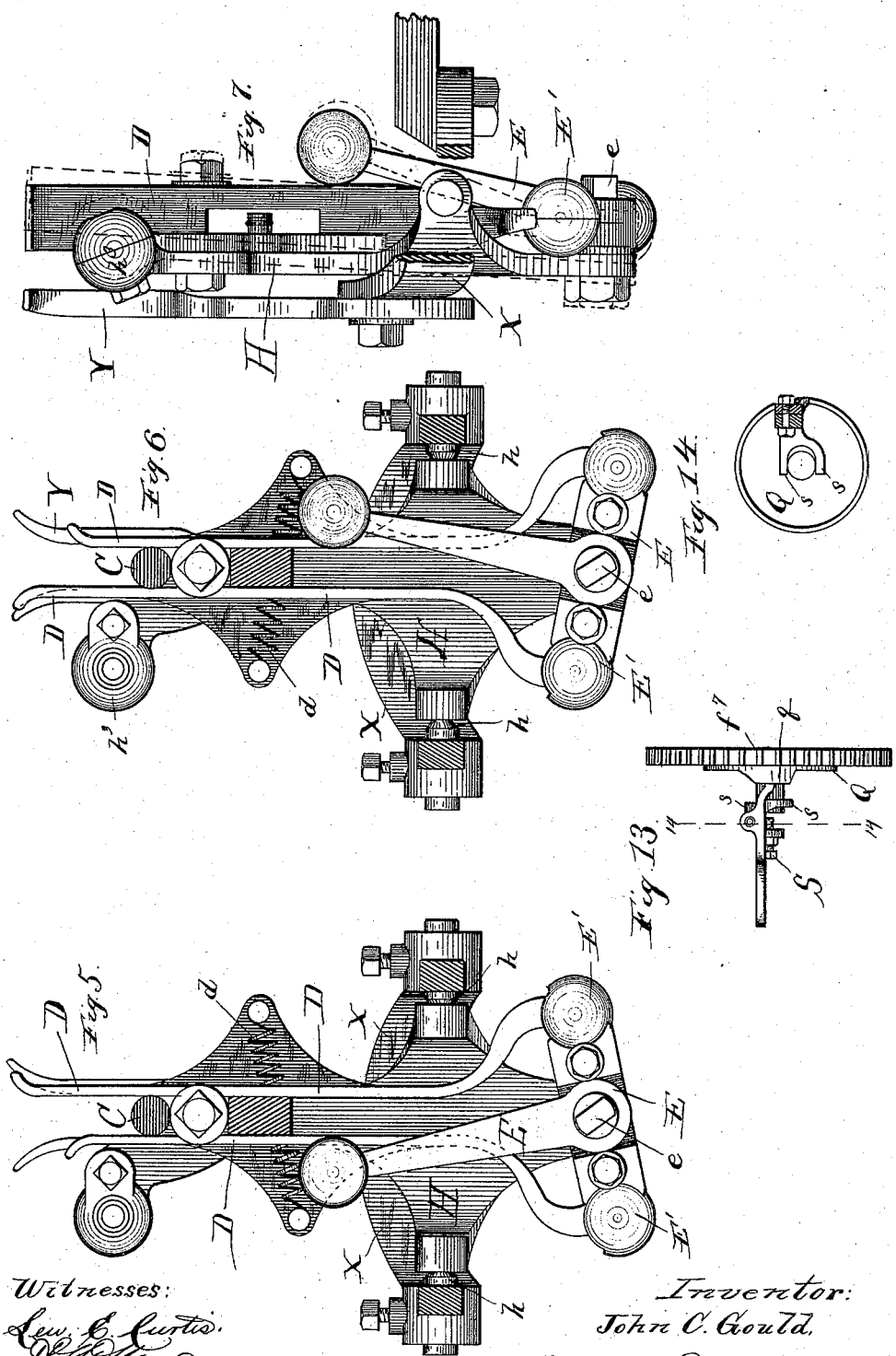

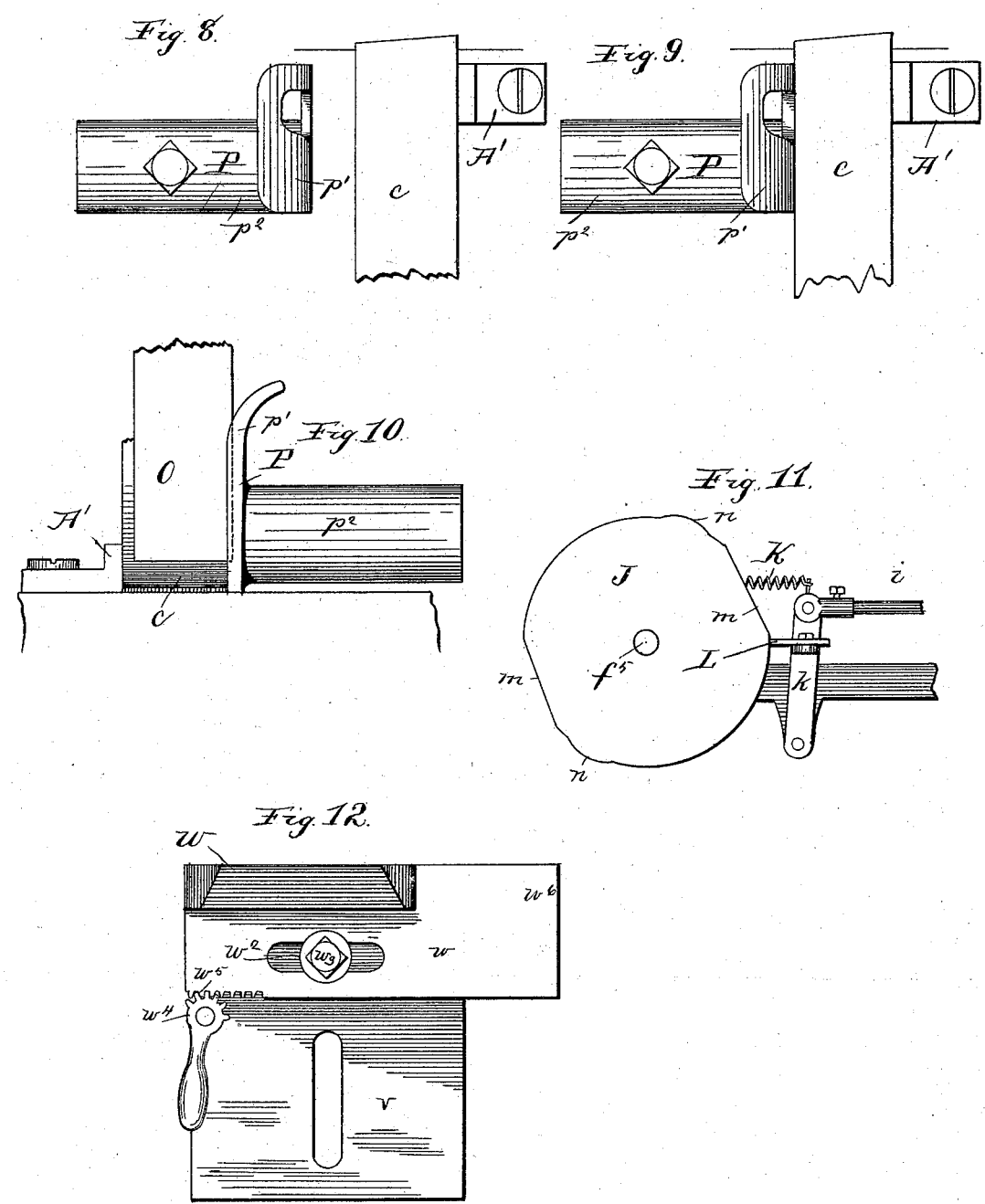

UNITED STATES PATENT OFFICE.

JOHN C. GOULD, OF CHICAGO, ILLINOIS.

NAIL-PLATE FEEDER.

SPECIFICATION forming part of Letters Patent No. 385,112, dated June 26, 1888.

Application filed July 25, 1887. Serial No. 245,183. (No model.)

*To all whom it may concern:*

Be it known that I, JOHN C. GOULD, a citizen of the United States, residing in Chicago, in the county of Cook and State of Illinois, have invented a new and useful Improvement in Nail-Plate Feeders, of which the following is a specification.

My present invention relates to the same general class of nail-plate feeders as those heretofore patented by me, and my object therein has been the making of the feeder more compact and more convenient for the operator than heretofore; also, to simplify, lighten, and cheapen it. Instead of the rotating barrel and its actuating segment or rack which have heretofore been employed to turn the plate, I have substituted in my present invention two opposite intermittently and reversely reciprocating surfaces which, during their reciprocation, clamp the nipper-rod between them and cause it to turn or roll alternately in either direction. These reversely-moving clamping-surfaces are also made to serve the further function of feeding the rod toward the knives, thereby devolving upon them the office of both the barrel and the grippers of the old machine. Instead, also, of oscillating the entire feeder, as has been done in the barrel-feeders, I now oscillate only the grippers and their supporting device. In the old machines it has not been customary to move the rod back from the knives independently of the barrel; but I find it desirable to give it a slight backward movement while it is being turned and soon after each cutting operation, whereby contact between the "long" corner of the nail-plate and the moving knife is avoided. This backward movement is imparted to the rod by oscillating or swinging the grippers backward after they have seized the rod and begun turning it, such backward movement of the grippers being additional to the main backward swing thereof, taking place in the intervals between their rotating actuations of the rod. I have also added to this feeder two positioning levers or guides, one of which comes down upon the plate in a vertical direction and compels it to assume a horizontal position, and the other of which approaches the plate laterally and moves it up to the stationary guard, both operating an instant previous to the severing of the nail and insuring the proper positioning of the nail-plate at the time the severing-knife strikes it. In this manner I avoid the production of very many imperfectly-headed nails.

There are numerous other features of novelty in the feeder which are fully illustrated in the drawings and described in the subjoined description.

Figure 2:
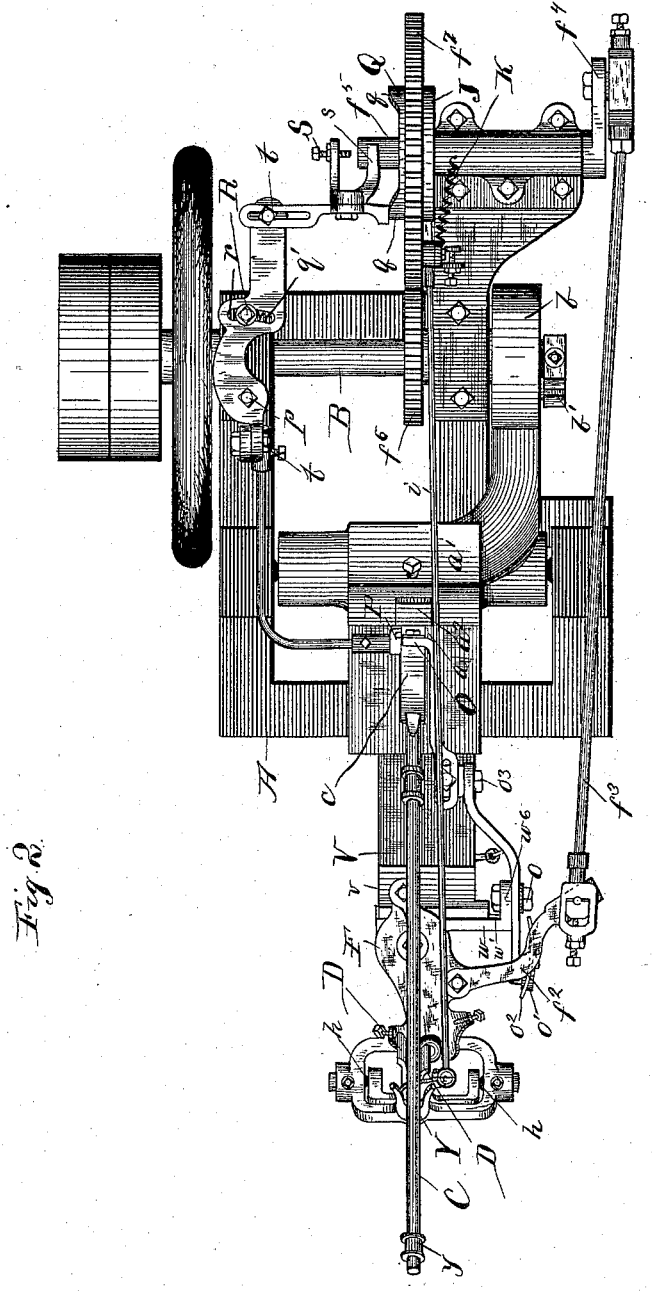
Figure 3:
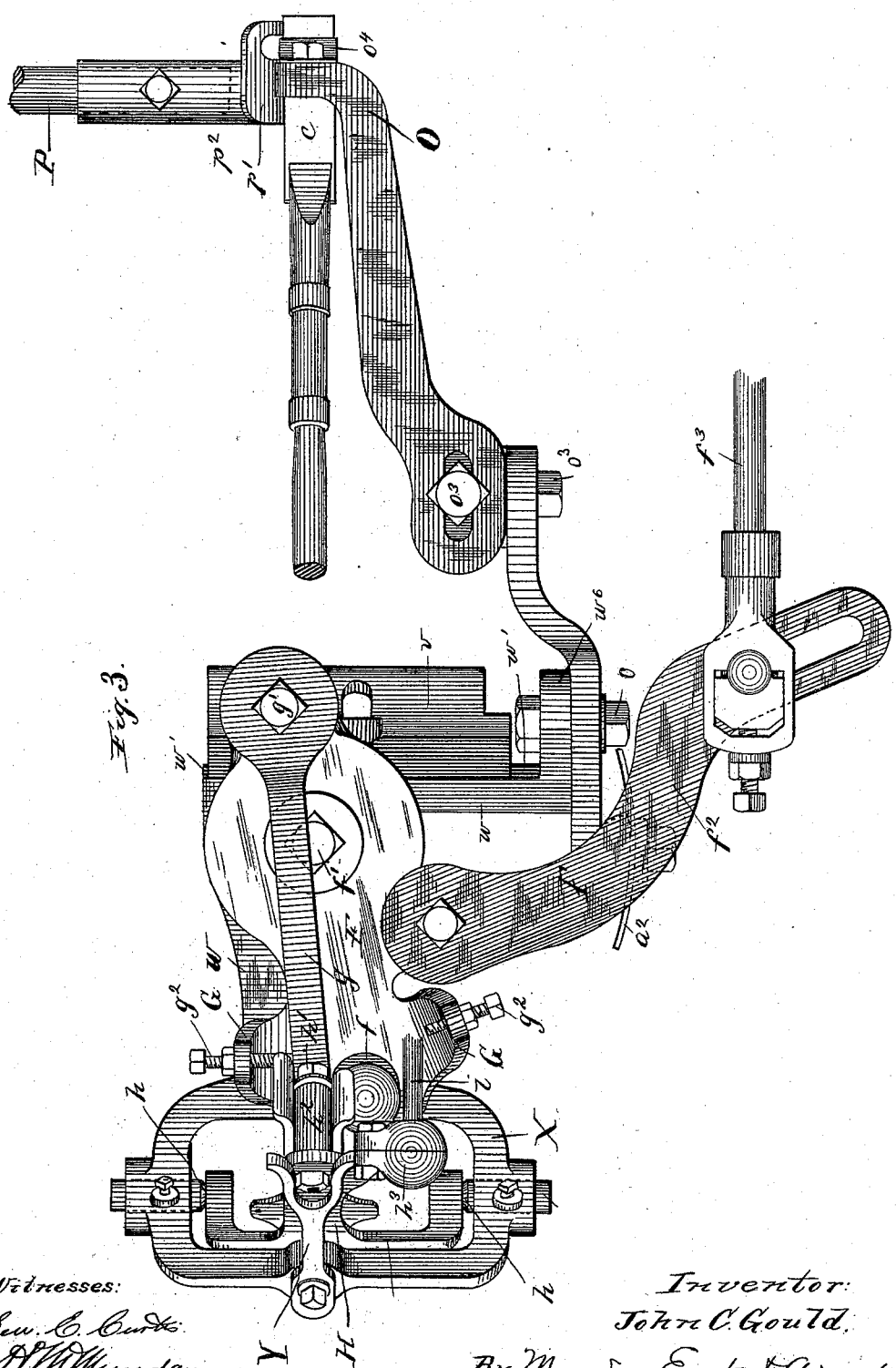

In the accompanying drawings, which form a part of this specification, and in which similar letters of reference indicate like parts, Figure 1 is a side elevation, and Fig. 2 a plan, of my improved feeder, the same being shown as attached to an ordinary nail-machine for making cut nails. Fig. 3 is an enlarged plan of the feeder, some of the parts being broken away to show parts which would otherwise be covered. Fig. 4 is an enlarged side elevation of the feeder. Figs. 5 and 6 are vertical sections upon the line 5 5 of Fig. 4, showing the parts in different positions. Fig. 7 is a side view of the grippers and their support, the latter being partly broken away. Figs. 8 and 9 are plan views showing the lateral guide, the nail-plate, and the stationary guard, Fig. 8 showing the guide about to act upon the plate, and Fig. 9 showing it after it has acted. Fig. 10 is a partial vertical section showing the action of both the vertical and lateral guides. Fig. 11 is an elevation of the cam from which the grippers are swung back and forward in their feeding movements and the connections therewith of the arm by which motion is transmitted from the cam. Fig. 12 is a detail elevation of the adjustable supporting-bracket by which the feeder is supported from the nail-machine. Fig. 13 is a detail view of the cam for actuating the laterally-positioning guide and its connections. Fig. 14 is a section of the same upon the line 14 14 of Fig. 13.

In said drawings, A represents the bed or stationary frame of the nail-machine, $a$ being the stationary shear or knife, and $a'$ the rocking or pivoted block carrying the moving shear-knife $a^2$.

B is the driving-shaft, and is connected to the pivoted block in any of the usual ways for actuating the latter, as by the wheel $b$ and pitman $b'$.

C is the nail-plate rod, and $c$ the nail-plate. The mechanism by which the rod is turned to reverse the nail-plate will first be described. It will be noticed that the rod passes between two upright pieces, D D. These pieces D are supported one in either extremity of a lever, in the form of the inverted T shown at E, and are reciprocated simultaneously, but in opposite directions, by the rocking of said T upon the axis $e$. At their upper ends the uprights D are yieldingly held together by the spring $d$, attached to a boss upon each, such spring causing them to clamp the rod with sufficient friction to insure its being rotated or rolled when the uprights are reciprocated. By reason of their gripping action upon the rod I call these parts the "grippers." The opposing faces of the grippers may be slightly corrugated or roughened in such manner as to cause them to exert greater friction upon the rod in turning the latter; but care should be taken that no serious obstacle is interposed to the rods slipping lengthwise through them. The upper end of the T is made spherical, as shown, and rests in a notch, $f$, formed in one end of an elbow-lever, F, pivoted at $f''$, connected at the other end by the pitman-rod $f^3$ with the crank $f^4$ upon the shaft $f^5$, geared with the driving shaft by gears $f^6$ and $f^7$. At each revolution of the crank $f^4$ the lever F is swung upon its pivot, and the T, whereby the clamping-grippers are reciprocated, is rocked upon its axis. For convenience, one arm, $f^2$, of lever F is made separate from and bolted to the rest of the lever F, and the bottoms of the clamping-grippers D are preferably made spherical, one side of the sockets therefor being formed by the removable piece E', bolted to E by bolts $e'$, as shown. The joints between the pitman and the crank and lever should preferably be such as permit considerable freedom of movement and adjustment without detaching the parts, as shown by the joint illustrated in Fig. 3 between the pitman and lever.

The action of the clamp upon the rod must of course be intermittent, to allow the rod to be fed along after each cutting operation, and to permit this the lever F is provided with ears G at either side, which come in contact at the end of each swinging movement with an arm, $g$, (which may also be loosely or pivotally joined at one end to lever F, as shown at $g'$,) and as the free end of said arm is inserted between the grippers it follows that when said arm is struck by one of said ears it forces one of the grippers away from the other, according to the direction in which lever F may be moving, thus separating the parts of the clamp and releasing the rod and allowing the grippers to be moved back without wearing the rod. To render the contact between the ears G and the arm $g$ adjustable, I provide said ears with set-screws $g^2$, which serve as contact-points to move the arm.

To permit the oscillation of the grippers, so they may be moved back upon the rod after each cut, I support them through the medium of axis $e$ and rocker E, from upright plate H, located directly in their rear, and impart the oscillation directly to said plate, which is pivoted upon the points $h$ at either side. I also secure them to said plate H at the upper ends by bolt and washer $h'$, passing between the grippers and provided with a ferrule, $h^2$, to avoid friction. The oscillation is caused by the cam J, secured to gear $f^7$, and is transmitted to the plate by the pitman rod $i$, joined to the plate at $h^3$. The pitman is provided at the other end with a swinging support, $k$, and is drawn toward the cam by the spring K, a guide, L, upon support $k$ serving as the contact-point, riding upon the periphery of the cam. The cam has two flat surfaces, $m$, located upon opposite sides, each of which first allows the pitman to move toward the center of the cam, and then immediately forces it back again, thereby oscillating the grippers in the first place toward the knives and back again without lapse of time. The grippers thus feed the plate twice at each revolution of the cam. These movements are timed to take place at the conclusion of each rotary movement of the rod and before the reverse rotation has commenced and during the intervals when the grippers have released their hold of the rod; but the cam periphery is also provided with two risers or enlargements located between the surfaces $m$, each of which is adapted to communicate an additional impulse or oscillation to the grippers and move them farther back after they have seized the rod and begun to rotate it. These risers are seen at $n$, Fig. 11, and their purpose is to carry the plate back far enough so the corners of the plate, and especially the long one, will not interfere with the knife.

O and P are two positioning levers or guides. The first of these moves down upon the plate from above and levels the plate, if it has not already assumed the horizontal position, and the other moves it up against the stationary guard A', if it should not be in that position at the termination of the reversing rotation. They are both calculated to act upon the plate in close proximity to the cutting-point, and are both timed and actuated to be moved upon the plate just previous to each cutting operation and to retreat immediately after, so as not to interfere with the reversing or feeding of the plate. The lever O is stationarily pivoted at $o$, and at the end back of said pivot carries a roller, $o'$, which at each swing of the elbow-lever F is acted upon by the double incline $o^2$, carried by said elbow-lever, in such manner as to raise the opposite extreme of the guide-lever O at the proper times. The lever O is preferably made in three parts, with adjustable joints at $o^3$, and the acting point may be a separate piece of thin hard metal, $o^4$, secured by a bolt, as shown. A spring, M, acts upon the lever at all times to prevent its being thrown upward, and as it is thus held down by a yielding power it does no harm if it strikes the plate when the latter is standing edgewise.

The positioning-lever P moves horizontally, and is pivoted at $p$ to the frame A. It is actuated by the cam Q, having operating projections $q$ at opposite sides and secured to the gear $f^7$. To insure the return of the lever after it has been moved by the projections $q$, a spring, $q'$, is inserted in the socket $r$ in the lever between the end of said socket and the stationary bolt R, passing through said socket and entering the frame A. A set-screw, S, regulates the back-throw of the spring by its contact with the shaft of gear $f^7$, and the arms $s$—one above and the other below said shaft—center and steady the cam end of the lever. This lever is preferably made in parts with joints at $t\ t$, at some or all of which adjustability is desirable.

The feeder is in the main supported from the bracket V, bolted to the frame of the nail-machine, a vertically-adjustable plate, $v$, being bolted to the upturned edge of bracket V, and a horizontal plate, W, being secured upon said plate $v$ by a joint permitting lateral adjustment of the former. The plate W has a downturned flange, $w$, provided with a horizontal rib, $w'$, and elongated slot $w^2$, while the plate $v$ has a groove fitting said rib, the securing-bolt $w^3$ passing through the flange and plate $v$, as shown in Fig. 12. A toothed sector, $w^4$, on plate $v$ and rack $w^5$ on plate W are employed in the lateral adjustment of plate W, and as the entire feeder is moved when this adjustment is made the value of this feature will be seen. The plate W receives the pivot of and supports the elbow-lever F, and the lateral extension $w^6$ thereof supports the pivot of positioning-lever O. Said plate also serves to support the frame X, whereby the grippers are sustained through the medium of plate H.

In the rear of the grippers I prefer to employ a stationary forked rest, Y, which may be secured to frame X. This rest is large enough to receive the gripper-rod without interfering with any of its movements, and it acts as a stop in connection with the stop-ring $y$ upon the rod to prevent further movement of the rod inward when the plate has been cut up as far as safety will permit without injury to the clamping-nippers at the end of the rod.

One very desirable feature of my machine is the facility with which access is had to the knives of the nail-machine, it only being necessary to turn back the lever O upon its pivot and to raise the operating end of lever P upon one of the joints in said lever to afford the operator every opportunity needed to enable him to take out or adjust the knives. The plate is also more closely and securely confined than in any previous machine, being guarded on all four sides, and thereby insuring the uniform production of perfect nails.

The lever P is provided with an operating-point, $p'$, which is attached to the main body of the lever by means of a sleeve, $p^2$, secured by a set-screw, thereby enabling the moving of the sleeve whenever a change is made in the width of the nail-plate.

I claim—

1. The combination, with the nail-plate rod and with the knives of the nail-machine, of feeding-grippers reciprocating simultaneously in opposite directions and adapted to reverse the rod, substantially as set forth.

2. The combination, with the nail-plate rod and the cutting-knives, of grippers D, reciprocating simultaneously in opposite directions and adapted to reverse the rod, and a rocking lever or its equivalent for actuating said grippers, substantially as set forth.

3. The combination, with the nail-plate rod and the cutting-knives, of grippers D, reciprocating simultaneously in opposite directions to reverse said rod, and also oscillating to feed said rod, a rocking-lever, or its equivalent, imparting the reciprocation, and an oscillating support for said lever imparting the oscillation, substantially as set forth.

4. In a nail-plate feeder, the combination, with the nail-plate rod, of oppositely-reciprocating simultaneously-acting grippers adapted to reverse the rod, and arm $g$, or its equivalent, for operating said grippers and releasing the rod intermittently, substantially as set forth.

5. In a nail-plate feeder, the combination, with the nail-plate rod, of grippers reciprocating simultaneously in opposite directions to reverse the rod and oscillating to feed the plate, and an arm, $g$, or its equivalent, for intermittently separating such grippers to release the rod, substantially as set forth.

6. The nail-plate feeder wherein are combined grippers adapted to reverse the rod and to feed it and positioning-levers O and P, substantially as set forth.

7. In a nail-plate feeder, the combination of two opposing grippers yieldingly held together by a spring at their upper ends, as shown, and a rocking lever, E, in which said grippers are supported at their lower ends, and by which they are reciprocated, substantially as specified.

8. In a nail-plate feeder, the combination of grippers D with the pivoted inverted-T lever, in the extremities of which the grippers are supported, and a lever, F, for rocking the T-lever, substantially as set forth.

9. The combination of grippers D, the rocking T, and the plate H, the latter supporting the T and the T supporting the grippers, substantially as set forth.

10. The combination, with the oscillating grippers, of a cam and connections for causing such oscillation, the cam having the risers for acting upon the grippers while they have hold of the rod and causing them to withdraw the plate to clear the knife, substantially as specified.

11. The combination, with the oppositely-reciprocating grippers and their actuating-lever, of the cam J, mechanically connected to said grippers and having the risers for oscillating the grippers while they are reciprocating, substantially as specified.

12. The oscillating grippers for feeding the rod, in combination with their actuating-cam, when said cam is provided with risers $n$, and also adapted to actuate the grippers to withdraw the rod after each cut, substantially as specified.

13. The combination, with the grippers of a nail-plate feeder, of a cam, or its equivalent, for oscillating said grippers, acting to give them two backward oscillations, one while the rod is not held by them and one while it is held, substantially as specified.

14. In a nail-plate feeder, the combination, with the oscillating and oppositely-reciprocating grippers, of the positioning levers O and P, substantially as specified.

15. In a nail-plate feeder, the combination, with the grippers and the rocking T and their supports, of the lever F, substantially as specified.

16. In a nail-plate feeder, the combination, with the grippers and the rocking T and their supports, of the lever F and the plate W, by which all said parts are sustained, substantially as specified.

17. The combination, with the grippers, of the lever F, the separating-arm, and the ears upon said lever striking said arm and separating the grippers, substantially as specified.

18. The frame X, the plate H, pivotally supported in said frame, the grippers, and their actuating T, in combination with the cam and pitman for causing the oscillation of the grippers, substantially as specified.

19. In a nail-plate feeder wherein the plate is reversed and fed by grippers acting upon the rod, the combination, with such grippers, of positioning-levers controlling the point of the plate, such levers being pivoted or jointed so as to be capable of being turned out of the way to give access to the knives of the nail-machine, substantially as set forth.

20. In a nail-plate feeder the support W whereof is laterally adjustable, as set forth, the combination, with support W, of the sector and rack for moving the same in effecting the adjustment and the stationary plate $v$, upon which the support W is carried, substantially as set forth.

21. In a nail-plate feeder, and in combination with the plate feeding and turning grippers, the lever O, for positioning the plate, when said lever is provided with one or more adjustable joints, $o^3$, substantially as set forth.

22. The cam Q $q$, in combination with the lever actuated thereby, when said lever is provided with a set-screw, S, regulating its back-throw, and spring $q'$, substantially as set forth.

23. The nail-plate feeder in which are combined the rod turning and feeding devices and a laterally-positioning lever, P, when the operating-point of said lever is secured to movable sleeve $p^2$, and is thus made adjustable to accommodate different widths of plates, substantially as set forth.

24. The nail-plate feeder the feeding-grippers whereof reciprocate simultaneously in opposite directions to reverse the plate, and also oscillate backward to withdraw the plate while it is being reversed, and are combined with a lever, or its equivalent for imparting the reciprocation, and a cam, or its equivalent, for imparting the oscillation, substantially as set forth.

JOHN C. GOULD.

Witnesses:
 EDW. S. EVARTS,
 H. M. MUNDAY.